(12) United States Patent
Chin et al.

(10) Patent No.: US 8,497,048 B2
(45) Date of Patent: Jul. 30, 2013

(54) FUEL CELL SEPARATOR HAVING AIRTIGHT GASKET

(75) Inventors: Sang Mun Chin, Seoul (KR); Sae Hoon Kim, Gyeonggi-do (KR); Yoo Chang Yang, Gyeonggi-do (KR); Suk Min Baeck, Gyeonggi-do (KR); Seong Il Heo, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 923 days.

(21) Appl. No.: 12/622,206

(22) Filed: Nov. 19, 2009

(65) Prior Publication Data
US 2011/0033781 A1 Feb. 10, 2011

(30) Foreign Application Priority Data

Aug. 10, 2009 (KR) .................. 10-2009-0073378

(51) Int. Cl.
*H01M 2/08* (2006.01)
(52) U.S. Cl.
USPC .................. 429/510; 429/508; 429/514
(58) Field of Classification Search
USPC .......................... 429/510, 508, 514
See application file for complete search history.

(56) References Cited

FOREIGN PATENT DOCUMENTS

| EP | 1739774 A2 | 1/2007 |
|---|---|---|
| JP | 11-179755 A | 7/1999 |
| JP | 2002-093434 A | 3/2002 |
| JP | 2003-217616 A | 7/2003 |
| JP | 2004-335178 A | 11/2004 |
| JP | 2005-317311 A | 11/2005 |
| JP | 2006-107985 A | 4/2006 |
| JP | 2008-146986 A | 6/2008 |
| KR | 10-0778634 B1 | 11/2007 |

OTHER PUBLICATIONS

Machine translation of JP 2006-107985, accessed Jan. 2013.*
Machine translation of JP 11-179755, accessed Jan. 2013.*

* cited by examiner

*Primary Examiner* — Nicholas P D'Aniello
(74) *Attorney, Agent, or Firm* — Edwards Wildman Palmer LLP; Peter F. Corless

(57) ABSTRACT

The present invention provides a fuel cell separator having an airtight gasket, in which a gasket is integrally injection-molded in a region that requires airtightness of a fuel cell separator to maintain airtightness of each flow field of the separator and to smoothly guide the fluid flow in each flow field.
For this purpose, the present invention provides a fuel cell separator having an airtight gasket, which is integrally injection-molded on both surfaces of the separator to form a closed curve.

9 Claims, 19 Drawing Sheets

FUEL CELL SEPARATOR HAVING AIRTIGHT GASKET

CROSS-REFERENCE TO RELATED APPLICATION

This application claims under 35 U.S.C. §119(a) the benefit of Korean Patent Application No. 10-2009-0073378 filed Aug. 10, 2009, the entire contents of which are incorporated herein by reference.

BACKGROUND (a) Technical Field

The present disclosure relates, generally, to a fuel cell separator having an airtight gasket and a method for manufacturing the same. More particularly, it relates to a fuel cell separator having an airtight gasket and a method for manufacturing the same, in which a gasket is suitably integrally injection-molded in a region that requires airtightness of a fuel cell separator to suitably maintain air tightness of each flow field of the separator and to smoothly guide the fluid flow in each flow field.

(b) Background Art

A typical structure of a fuel cell stack is described briefly with respect to FIG. 14 below. Preferably, a membrane electrode assembly (MEA) is suitably located in the middle of the fuel cell stack and preferably includes a polymer electrolyte membrane 10, through which hydrogen ions (protons) are suitably transported, and an electrode/catalyst layer such as an air electrode (cathode) 12 and a fuel electrode (anode) 14, in which an electrochemical reaction between hydrogen and oxygen takes place, suitably disposed on each of both sides of the polymer electrolyte membrane 10.

Preferably, a gas diffusion layer (GDL) 16 and a gasket 18 are sequentially stacked on both sides of the MEA, where the cathode 12 and the anode 14 are located. A separator 20 including flow fields for supplying fuel and discharging water generated by the reaction is suitably located on the outside of the GDL 16, and an end plate 30 for supporting and fixing the above-described components is suitably connected to each of both ends thereof.

Accordingly, at the anode 14 of the fuel cell stack, hydrogen is suitably dissociated into hydrogen ions (protons, $H^+$) and electrons ($e^-$) by an oxidation reaction of hydrogen. The hydrogen ions and electrons are transmitted to the cathode 12 through the electrolyte membrane 10 and the separator 20, respectively. At the cathode 12, water is produced by an electrochemical reaction in which the hydrogen ions and electrons transmitted from the anode 14 and the oxygen in air participate and, at the same time, electrical energy is suitably produced by the flow of electrons.

In the fuel cell stack, the gasket is preferably attached to the separator and serves as a basis for suitably defining each unit cell of the fuel cell stack and suitably functions to maintain airtightness of each of hydrogen, coolant, and air flow fields formed on the surface of the separator. Accordingly, in order to ensure the functions of the gasket, the method of attaching the gasket to the separator and the selection of a material for the gasket during manufacturing of the fuel cell stack are considered.

Accordingly, in the connection structure between the separator and the gasket, the function of preventing hydrogen from being in direct contact with air, the function of preventing coolant from being in contact with hydrogen and air, and the function of preventing fluids (such as air, hydrogen, and coolant) from leaking to the outside are preferably required. Moreover, the gasket suitably arranged between the separators is needed to strongly support the separators.

Accordingly, a metal separator is suitably formed of a metal thin plate having a thickness of 0.1 to 0.2 mm by a molding process such as stamping to have flow fields. This metal separator may therefore considerably reduce the manufacturing time and cost compared to a graphite separator formed by a mechanical process to have the flow fields. However, there are certain considerations in designing an airtight structure.

Therefore, when a pair of plates having flow fields of an oxidation electrode and a reduction electrode are suitably stacked to form a metal separator, and when a gasket is suitably attached to each metal separator, the function of maintaining the airtightness of a cooling surface formed between the pair of plates and the function of maintaining the airtightness of the reactant gases and coolant between a plurality of separators stacked in series are considered. Moreover, the gasket should preferably serve to suitably support the separators and another gasket on the opposite side.

Preferably, the metal separator is required to have an airtight performance suitably higher than that of the graphite separator since the reactant gases and coolant are most likely to leak due to deformation caused by the thin metal plate.

An example of the prior art is shown in FIG. 12, where a connection structure between separators and gaskets is shown. Preferably, a back-up support as an independent structure is suitably introduced to maintain the airtightness of reactant gases and coolant flowing through flow fields of a separator and to serve as a support for another gasket on the opposite side placed on the same line, in which the back-up gasket attached to a gas surface of the separator through which air or hydrogen flows and the gasket attached to a cooling surface through which coolant flows are suitably separately provided.

However, with only the back-up structure, it is difficult to ensure the airtightness of flow fields, through which the reactant gases (such as hydrogen and air) flow, which face each other with a membrane electrode assembly (MEA) interposed therebetween. Moreover, an additional process is required to suitably manufacture the respective back-up gaskets and the gaskets should be suitably separately attached to both sides of each separator.

Another example of the prior art is shown in FIG. 13, in which an additional gasket line (dual seal) is suitably provided to improve the airtightness of reactant gases and the support function. However, in this structure, the gasket structure is complicated and the size of the separator is increased.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention preferably provides a fuel cell separator having a suitably airtight gasket, in which a pair of gaskets are integrally injection-molded on both surfaces of the separator to be continuously connected to each other so as to form a suitably closed curve, and a plurality of main lines and sub-lines are suitably provided between manifolds and flow field surfaces of the separator to smoothly guide the flow of reactant gases (such as hydrogen and air) and coolant and, at the same time, to provide a strong supporting force to the stacked separators.

In a preferred embodiment, the present invention preferably provides a fuel cell separator having an airtight gasket, characterized in that a gasket is integrally injection-molded on both surfaces of a separator to form a suitably closed curve In another preferred embodiment, the separator may preferably include a first separator and a second separator, a plurality of hydrogen transport holes may be suitably formed on an inner side of a hydrogen manifold, which is suitably formed on both ends of the first separator, in a position adjacent to a hydrogen flow field and suitably arranged along the width direction of the separator, and a plurality of air transport holes may preferably be formed on an inner side of an air manifold, which is suitably formed on both ends of the second separator, in a position adjacent to an air flow field and suitably arranged along the width direction of the separator.

In another preferred embodiment, a plurality of injection molding holes, through which an injection molding material passes toward the inner or outer surfaces of the separator during injection molding of the gasket, may be suitably formed to penetrate four corner ends of each of the pair separator and boundary surfaces between each of manifolds.

In still another preferred embodiment, the gasket may preferably include a first gasket and a second gasket, and the first gasket provided on the first separator may preferably include, but is not limited only to: a side line integrally injection-molded on inner and outer surfaces of the first separator along the four corners thereof; a first 1-main line suitably formed on the outer surface of the first separator and extending through a space between the inner sides of the hydrogen manifold and the hydrogen transport holes to a region adjacent to the inner sides of a coolant and air manifolds suitably placed on the same line as the hydrogen manifold along the width direction; a first 2-main line suitably formed on the inner surface of the first separator and extending through a space between the hydrogen transport holes and the coolant flow field to a region adjacent to the inner side of the air manifold placed on the same line along the width direction; and a plurality of first coolant guide lines formed on the inner surface of the first separator and suitably arranged between the coolant manifold and the coolant flow field along the longitudinal direction.

In yet another preferred embodiment, a plurality of first 1-sub-lines extending toward the hydrogen flow field may be integrally formed on the inner side of the first 1-main line and suitably arranged at regular intervals in the width direction, and a plurality of first 1'-sub-lines extending toward the hydrogen, coolant, and air manifolds may be integrally formed on the outer side of the first 1-main line and suitably arranged at regular intervals in the width direction.

In still yet another preferred embodiment, a plurality of first 2-sub-lines extending toward the inner sides of the hydrogen and air manifolds may be integrally formed on the outer side of the first 2-main line and arranged at regular intervals in the width direction, and a plurality of first 2'-sub-lines extending toward the coolant flow field may be integrally formed on the inner side of the first 2-main line and suitably arranged at regular intervals in the width direction.

In a further preferred embodiment, a portion of the first 1'-sub-lines extending from the first 1-main line and the first 2-sub-lines extending from the first 2-main line may be integrally connected to each other on the inner sides of the hydrogen and air manifolds by a first connection line, and the rest of the first 1'-sub-lines extending from the first 1-main line and the first coolant guide lines may be integrally connected to each other on the inner side of the coolant manifold by a second connection line.

In another further preferred embodiment, the gasket may preferably include a first gasket and a second gasket, and the second gasket provided on the second separator may preferably include, but is not limited only to: a side line integrally injection-molded on inner and outer surfaces of the second separator along the four corners thereof; a second 1-main line suitably formed on the outer surface of the second separator and suitably extending through a space between the inner sides of the air manifold and the air transport holes to a region adjacent to the inner sides of the coolant and hydrogen manifolds placed on the same line as the air manifold along the width direction; a second 2-main line formed on the inner surface of the second separator and suitably extending through a space between the air transport holes and the coolant flow field to a region adjacent to the inner side of the hydrogen manifold placed on the same line along the width direction; and a plurality of second coolant guide lines suitably formed on the inner surface of the second separator and arranged between the coolant manifold and the coolant flow field along the longitudinal direction.

In still another further preferred embodiment, a plurality of second 1-sub-lines suitably extending toward the air flow field may be integrally formed on the inner side of the second 1-main line and suitably arranged at regular intervals in the width direction, and a plurality of second 1'-sub-lines extending toward the hydrogen, coolant, and air manifolds may be integrally formed on the outer side of the second 1-main line and suitably arranged at regular intervals in the width direction.

In yet another further preferred embodiment, a plurality of second 2-sub-lines extending toward the inner sides of the hydrogen and air manifolds may be integrally formed on the outer side of the second 2-main line and suitably arranged at regular intervals in the width direction, and a plurality of second 2'-sub-lines extending toward the coolant flow field may be integrally formed on the inner side of the second 2-main line and suitably arranged at regular intervals in the width direction.

In still yet another further preferred embodiment, a portion of the second 1'-sub-lines extending from the second 1-main line and the second 2-sub-lines extending from the second 2-main line may be integrally connected to each other on the inner sides of the hydrogen and air manifolds by a first connection line, and the rest of the second 1'-sub-lines extending from the second 1-main line and the second coolant guide lines may be integrally connected to each other on the inner side of the coolant manifold by a second connection line.

In another aspect, the present invention provides a method for manufacturing a fuel cell separator having an airtight gasket, the method including: suitably forming a plurality of injection molding holes penetrating a predetermined position of a separator for an injection molding process; suitably disposing the separator having the injection molding holes in a mold for injection molding and injecting an injection molding material for a gasket into the mold; and suitably extracting the separator having a gasket, which is integrally injection-molded on both surfaces thereof to form a closed curve, from the mold.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1A:
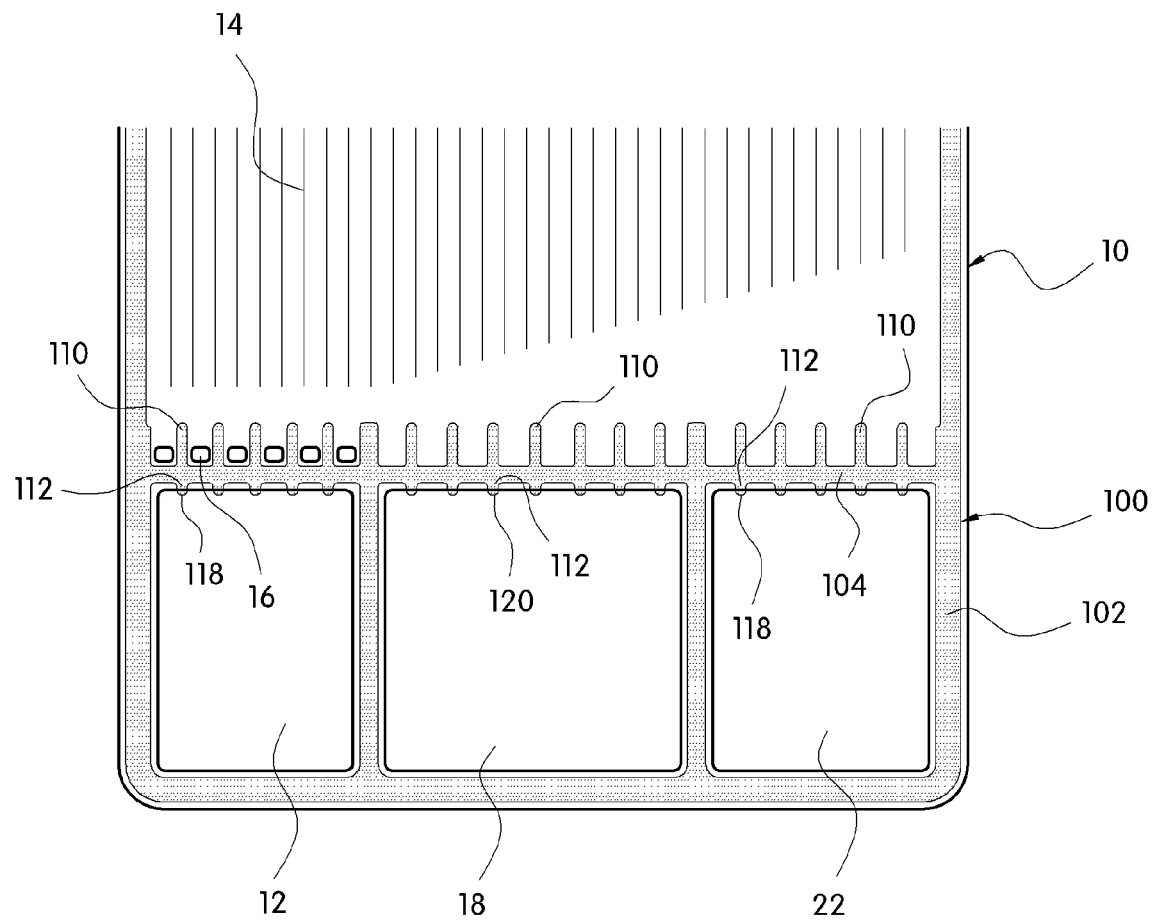
FIGS. 1A and 1B are a plan view and a bottom view showing a first separator of a fuel cell separator having an airtight gasket in accordance with certain embodiments of the present invention.

Reference numerals set forth in the Drawings includes reference to the following elements as further discussed below:

| | |
|---|---|
| 10: first separator | 20: second separator |
| 12: hydrogen manifold | 14: hydrogen flow field |
| 16: hydrogen transport hole | 18: coolant manifold |
| 22: air manifold | 24: air flow field |
| 26: air transport hole | 28: coolant flow field |
| 30: injection molding hole | 40: coolant flow path |
| 100: first gasket | 102: side line |
| 104: first 1-main line | 106: first 2-main line |
| 108: first coolant guide line | 110: first 1-sub-line |
| 112: first 1'-sub-line | 114: first 2-sub-line |
| 116: first 2'-sub-line | 118: first connection line |
| 120: second connection line | 200: second gasket |
| 202: side line | 204: second 1-main line |
| 206: second 2-main line | 208: second coolant guide line |
| 210: second 1-sub-line | 212: second 1'-sub-line |
| 214: second 2-sub-line | 216: second 2'-sub-line |
| 218: first connection line | 220: second connection line |
| 300: membrane electrode assembly | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

As described herein, the present invention features a fuel cell separator having an airtight gasket, wherein the gasket is integrally injection-molded on both surfaces of a separator.

In one embodiment, the gasket forms a closed curve.

In another embodiment, the separator comprises a first separator and a second separator.

In another further embodiment, the fuel cell separator further comprises a plurality of hydrogen transport holes that are formed on an inner side of a hydrogen manifold, which is formed on both ends of the first separator, in a position adjacent to a hydrogen flow field and arranged along the width direction of the separator, and a plurality of air transport holes are formed on an inner side of an air manifold, which is formed on both ends of the second separator, in a position adjacent to an air flow field and arranged along the width direction of the separator.

The present invention also features a method for manufacturing a fuel cell separator having an airtight gasket, the method comprising forming a plurality of injection molding holes penetrating a predetermined position of a separator for an injection molding process, disposing the separator having the injection molding holes in a mold for injection molding and injecting an injection molding material for a gasket into the mold, and extracting the separator having a gasket, which is integrally injection-molded on both surfaces thereof to form a closed curve, from the mold.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

In one aspect, the present invention provides a fuel cell separator having a suitably airtight gasket, which preferably consists of a pair of gaskets integrally injection-molded on both surfaces of a separator to be continuously connected to each other so as to form a suitably closed curve.

Preferably, the separator of the present invention is formed of a thin metal plate and includes a pair of first and second separators, which form suitably separate hydrogen, air, and coolant flow fields.

In a preferred embodiment, the pair of first and second separators are suitably stacked on both sides of a membrane electrode assembly including an electrolyte membrane, thus forming a unit cell of a fuel cell. A plurality of unit cells are suitably stacked and an end plate is suitably connected to each of both ends thereof, thus forming a fuel cell stack.

According to certain preferred embodiments, for example as shown in FIGS. 1A to 7B, the separator integrated with a gasket in accordance with the present invention preferably includes a pair of first and second separators 10 and 20, in which first and second gaskets 100 and 200 are suitably integrally injection-molded on both surfaces of the first and second separators 10 and 20 to be continuously connected to each other so as to form a suitably closed curve.

In certain preferred embodiments, for the injection molding of the first and second gaskets 100 and 200, a plurality of injection molding holes 30, through which an injection molding material passes, are suitably formed to penetrate four corner ends of each of the first and second separators 10 and 20 and boundary surfaces between each of manifolds. Preferably, the injection molding material flows through the injection molding holes 30 from one side of the first and second separators 10 and 20 to the other side thereof such that the first and second gaskets 100 and 200 are integrally injection-molded on both surfaces of the first and second separators 10 and 20.

Accordingly, in further preferred embodiments, a hydrogen manifold 12, a coolant manifold 18, and an air manifold 22 are suitably formed to penetrate both surfaces of the first and second separators 10 and 20, and flow fields are suitably formed therein.

In further preferred embodiments, a hydrogen flow field 14 is suitably formed on an outer surface of the first separator 10, an air flow field 24 is suitably formed on an outer surface of the second separator 20, and a coolant flow field 28 is suitably formed between inner surfaces of the first and second separators 10 and 20 stacked with respect to each other.

According to certain preferred embodiments of the present invention, a plurality of hydrogen transport holes 16 are suitably formed to vertically penetrate the inner side of the hydrogen manifold 12, formed on both ends of the first separator 10, in a position adjacent to the hydrogen flow field 14 and suitably arranged along the width direction of the separator. Further, a plurality of air transport holes 26 are suitably formed to vertically penetrate the inner side of the air manifold 22, formed on both ends of the second separator 20, in a position adjacent to the air flow field 24 and suitably arranged along the width direction of the separator.

Preferably, the structures of the first and second separators having the first and second gaskets integrally injection-molded therewith are described herein.

In another exemplary embodiment, the structure of the first separator having the first gasket integrally injection-molded therewith is described.

Figure 1B:
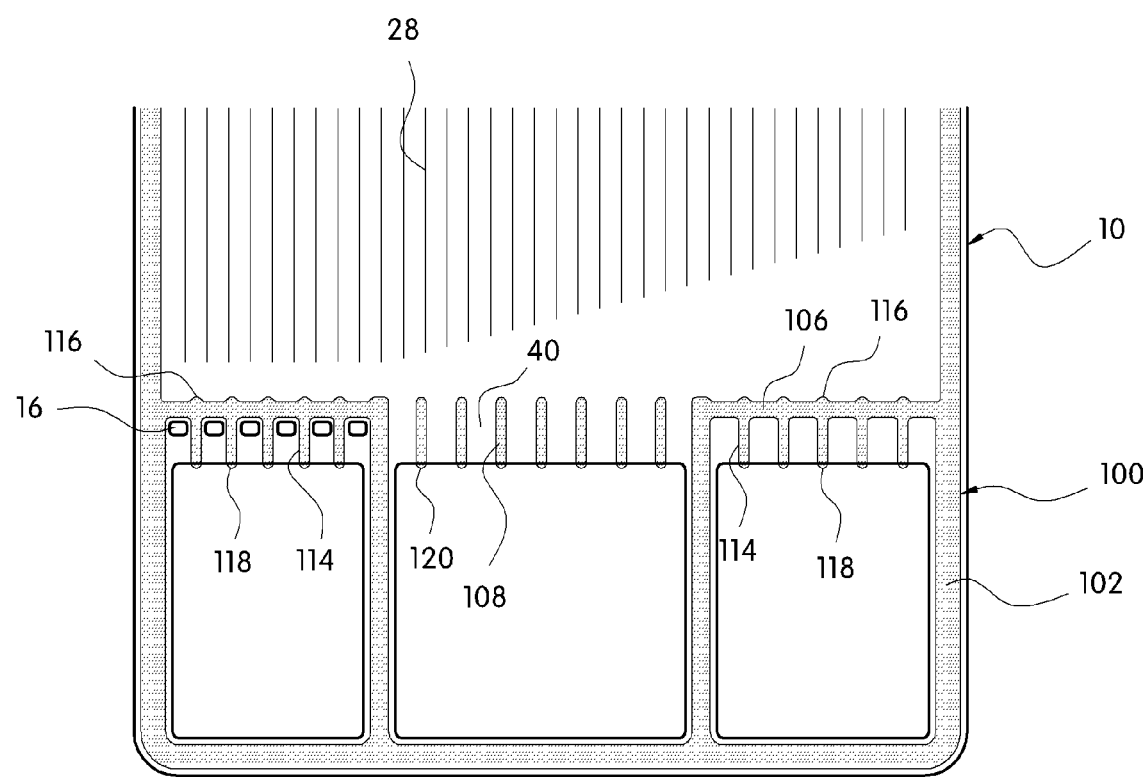
Figure 2:
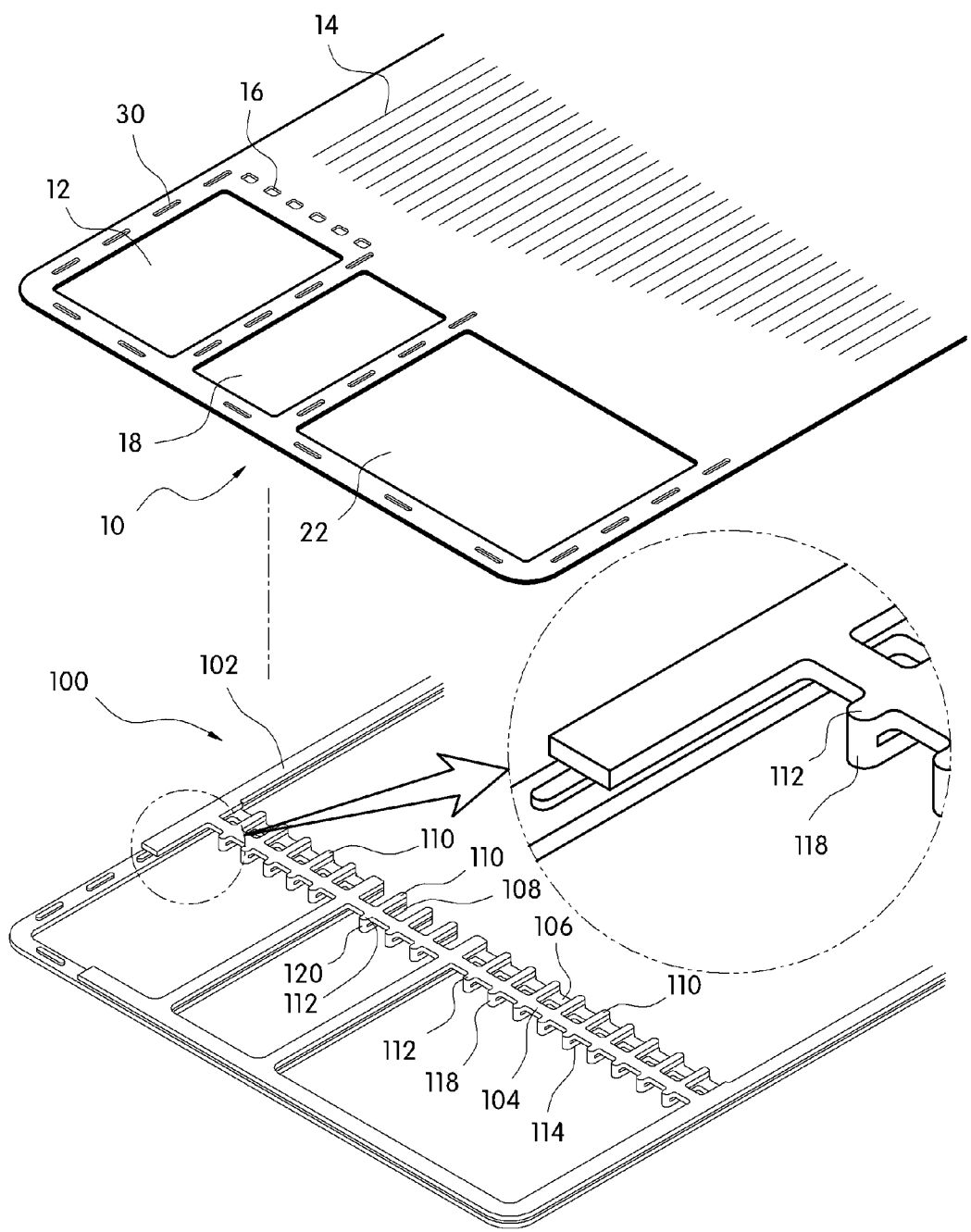
FIG. 2 is an exploded perspective view showing a gasket disassembled from the first separator of the fuel cell separator having an airtight gasket in accordance with other preferred embodiments of the present invention.
Figure 3A:
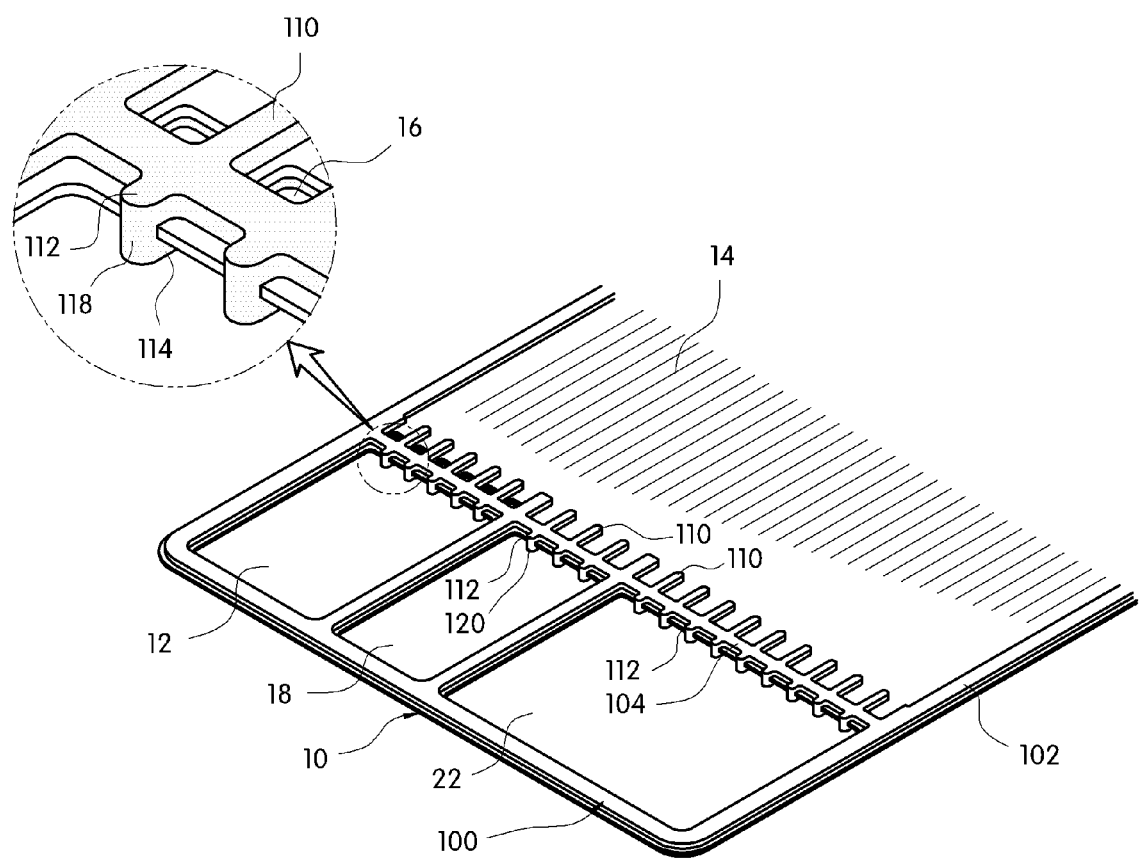
FIGS. 3A and 3B are perspective views showing a first separator of the fuel cell separator having an airtight gasket in accordance with preferred embodiments of the present invention.
Figure 3B:
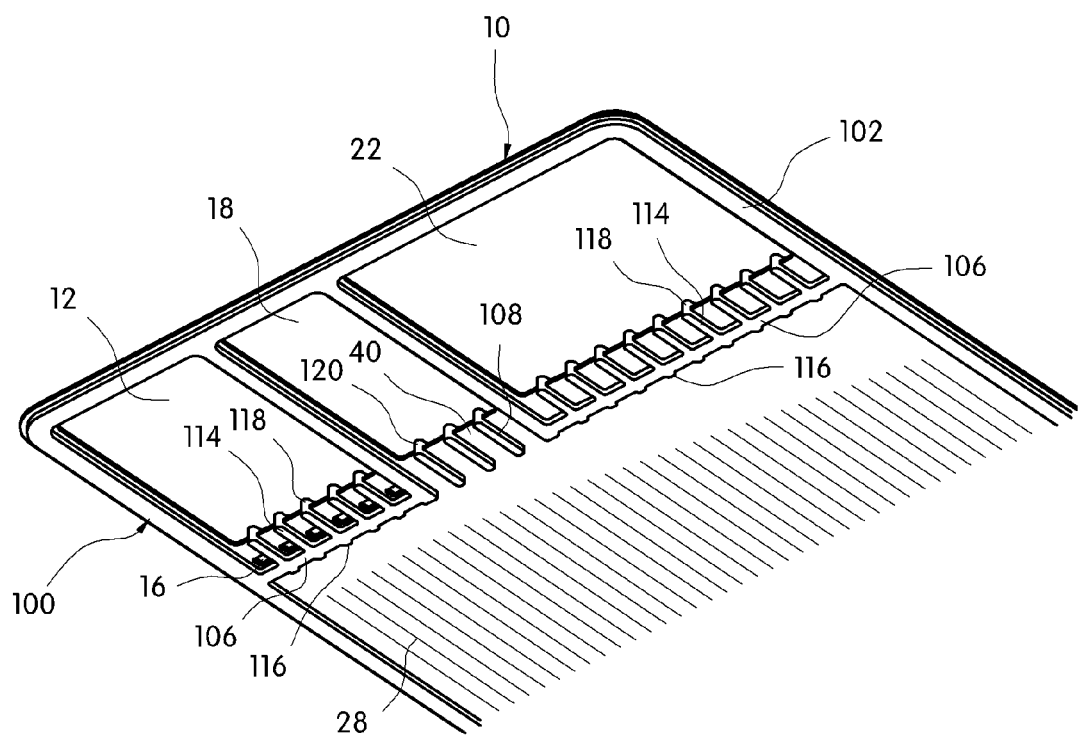

FIGS. 1A and 1B are an exemplary plan view and an exemplary bottom view showing the first separator of the fuel cell separator having an airtight gasket in accordance with preferred embodiments of the present invention. FIG. 2 is an exploded perspective view showing the gasket, which is intentionally disassembled from the first separator for a better understanding of the present invention. FIGS. 3A and 3B are exemplary perspective views showing the first separator of the fuel cell separator having the airtight gasket integrally injection-molded therewith in accordance with further preferred embodiments of the present invention.

Preferably, the first gasket 100 integrally injection-molded with the first separator 10 may be suitably divided into a side line 102, a first 1-main line 104, a first 2-main line 106, and a first coolant guide line 108.

In a further preferred embodiment, the side line 102 is integrally injection-molded on inner and outer surfaces of the first separator 10 along the four corners thereof and serves to prevent reactant gases or coolant from flowing to the outside.

Preferably, the first 1-main line 104 is integrally connected to the side line 102 formed on the four corners of the outer surface of the first separator 10 and crosses the width of the first separator 10.

In further preferred embodiments, the first 1-main line 104 is suitably formed on the outer surface of the first separator 10, i.e., on the outer surface on which the hydrogen flow field 14 is formed. Preferably, the first 1-main line 104 is integrally formed between the inner side of the hydrogen manifold 12 having a rectangular hole shape and the hydrogen transport holes 16 and suitably extends in the width direction of the separator to a region adjacent to the inner sides of the coolant manifold 18 and the air manifold 22 placed on the same line as the hydrogen manifold 12.

In further related embodiments, the first 2-main line 106 is integrally connected to the side line 102 formed on the four corners of the inner surface of the first separator 10 and crosses the width of the first separator 10.

Accordingly, the first 2-main line 106 is suitably formed on the inner surface of the first separator 10, i.e., on the inner surface on which the coolant flow field 28 is suitably formed. The first 2-main line 106 is integrally formed between the hydrogen transport holes 16 and the coolant flow field 28 along the width direction of the separator and also integrally formed in a region adjacent to the inner side of the air manifold 22 placed on the same line along the width direction of the separator.

In further preferred embodiments of the invention, a plurality of first coolant guide lines 108 are integrally injection-molded between the first 2-main lines 106, i.e., between the coolant manifold 18 and the coolant flow field 28 on the inner surface of the first separator 10 in the longitudinal direction of the separator.

Preferably, a plurality of sub-lines are integrally formed between the first 1-main line 104 and the first 2-main line 106 in the longitudinal direction of the separator. In further preferred embodiments, a first 1-sub-line 110 and a first 1'-sub line 112 are integrally formed on the first 1-main line 104, and a first 2-sub-line 114 and a first 2'-sub-line 116 are integrally formed on the first 2-main line 106.

According to other preferred embodiments of the invention, a plurality of first 1-sub-lines 110 having a predetermined length and extending toward the hydrogen flow field 14 are integrally formed on the inner side of the first 1-main line 104 and suitably arranged at regular intervals in the width direction. Further, a plurality of first 1'-sub-lines 112 having a length suitably smaller than that of the first 1-sub-lines 110 and extending toward the hydrogen, coolant, and air manifolds 12, 18, and 22 are integrally formed on the outer side of the first 1-main line 104 and suitably arranged at regular intervals in the width direction.

According to other preferred embodiments of the invention, a plurality of first 2-sub-lines 114 having a predetermined length and extending toward the inner sides of the hydrogen and air manifolds 12 and 22 are integrally formed on the outer side of the first 2-main line 106 and suitably arranged at regular intervals in the width direction. Further, a plurality of first 2'-sub-lines 116 having a suitably smaller than that of first 2-sub-lines 114 and extending toward the coolant flow field 28 are integrally formed on the inner side of the first 2-main line 106 and suitably arranged at regular intervals in the width direction.

In preferred embodiments, the end of the first 1'-sub-line 112 extending from the first 1-main line 104 toward the hydrogen and air manifolds 12 and 22 and the first 2-sub-line 114 extending from the first 2-main line 106 toward the hydrogen and air manifolds 12 and 22 are integrally connected to each other by a first connection line 118 on the inner sides of the hydrogen and air manifolds 12 and 22 having a rectangular hole shape. In further preferred embodiments, the end of the first 1'-sub-line 112 extending from the first 1-main line 104 toward the coolant manifold 18 and the first coolant guide line 108 are integrally connected by a second connection line 120 on the inner side of the coolant manifold 18 having a rectangular hole shape.

Accordingly, the side line 102 formed on the corners of both surfaces of the first separator 10 is integrally connected to the first 1- and 2-main lines 104 and 106 formed on both surfaces of the first separator 10. The first 1'-sub-lines 112 extending from the first 1-main line 104 and the first 2-sub-lines 114 extending from the first 2-main line 106 are integrally connected to each other by the first connection line 118. Preferably, the first 1'-sub-lines 112 extending from the first 1-main line 104 and the first coolant guide line 108 are integrally connected to each other by the second connection line 120. Accordingly, the side line 102, the first 1- and 2-main lines 104 and 106, the first 1- and 1'-sub-lines 110 and 112, the first 2- and 2'-sub-lines 114 and 116, and the first and second connection lines 118 and 120, which are the constituent elements of the first gasket 100, are integrally formed with each other to form a suitably closed curve.

Next, in further preferred embodiments, the structure of the second separator having the second gasket integrally injection-molded therewith is described.

Figure 4A:
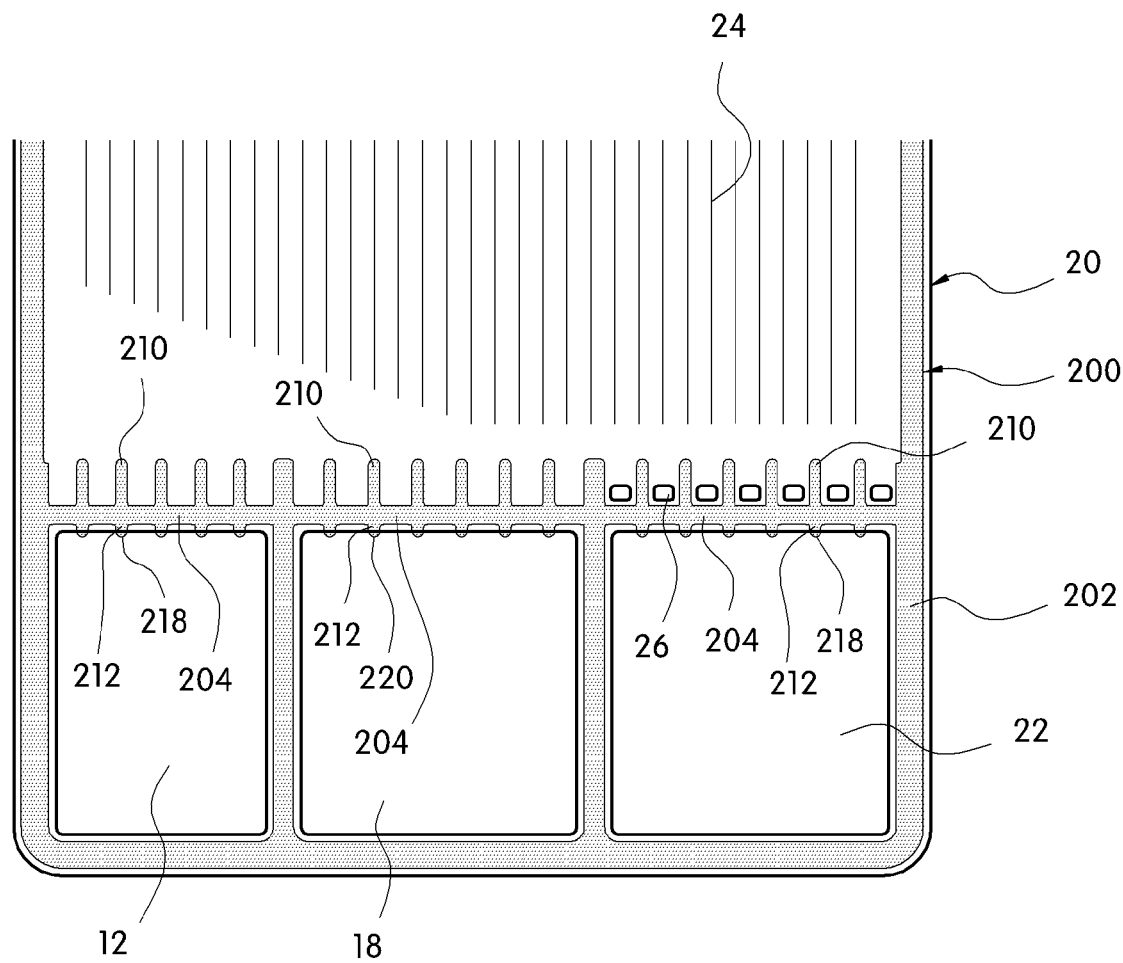
FIGS. 4A and 4B are an exemplary plan view and bottom view showing a second separator of the fuel cell separator having an airtight gasket in accordance with preferred embodiments of the present invention.
Figure 4B:
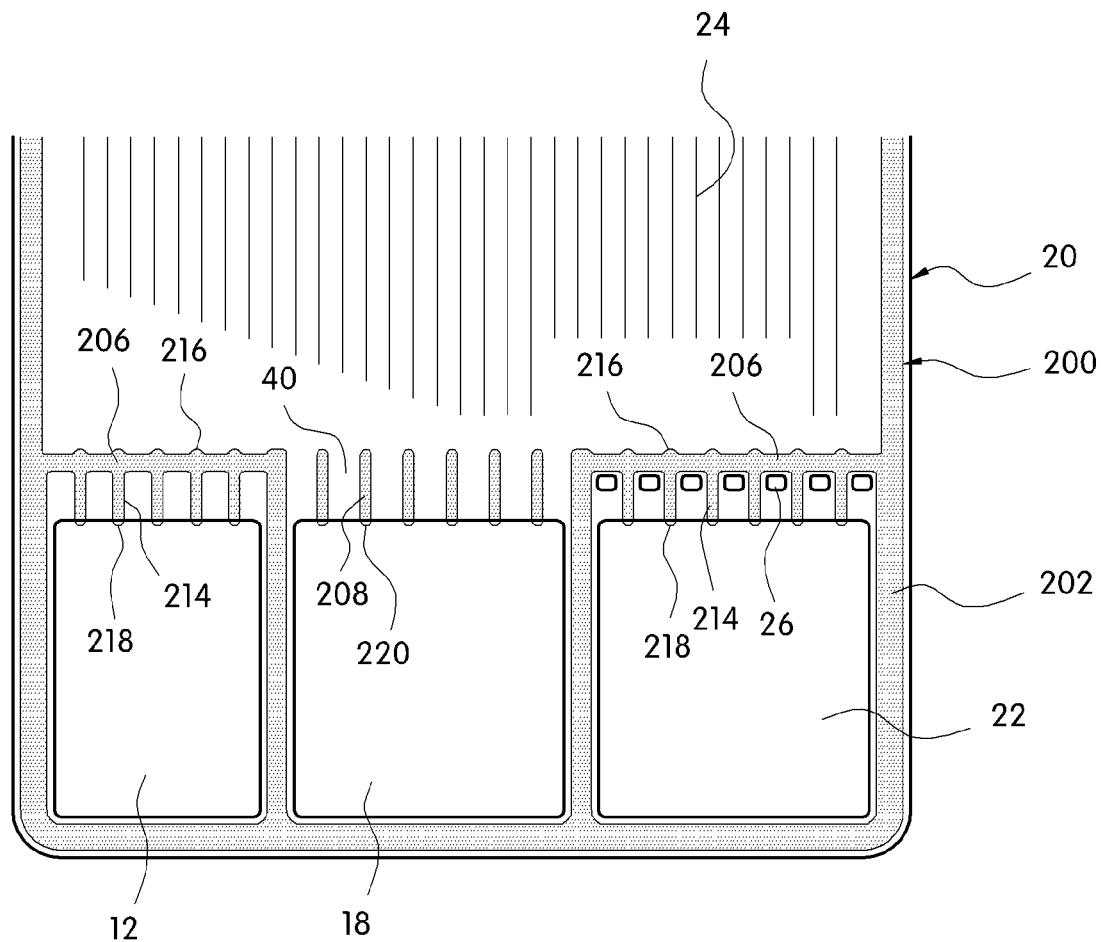
Figure 5:
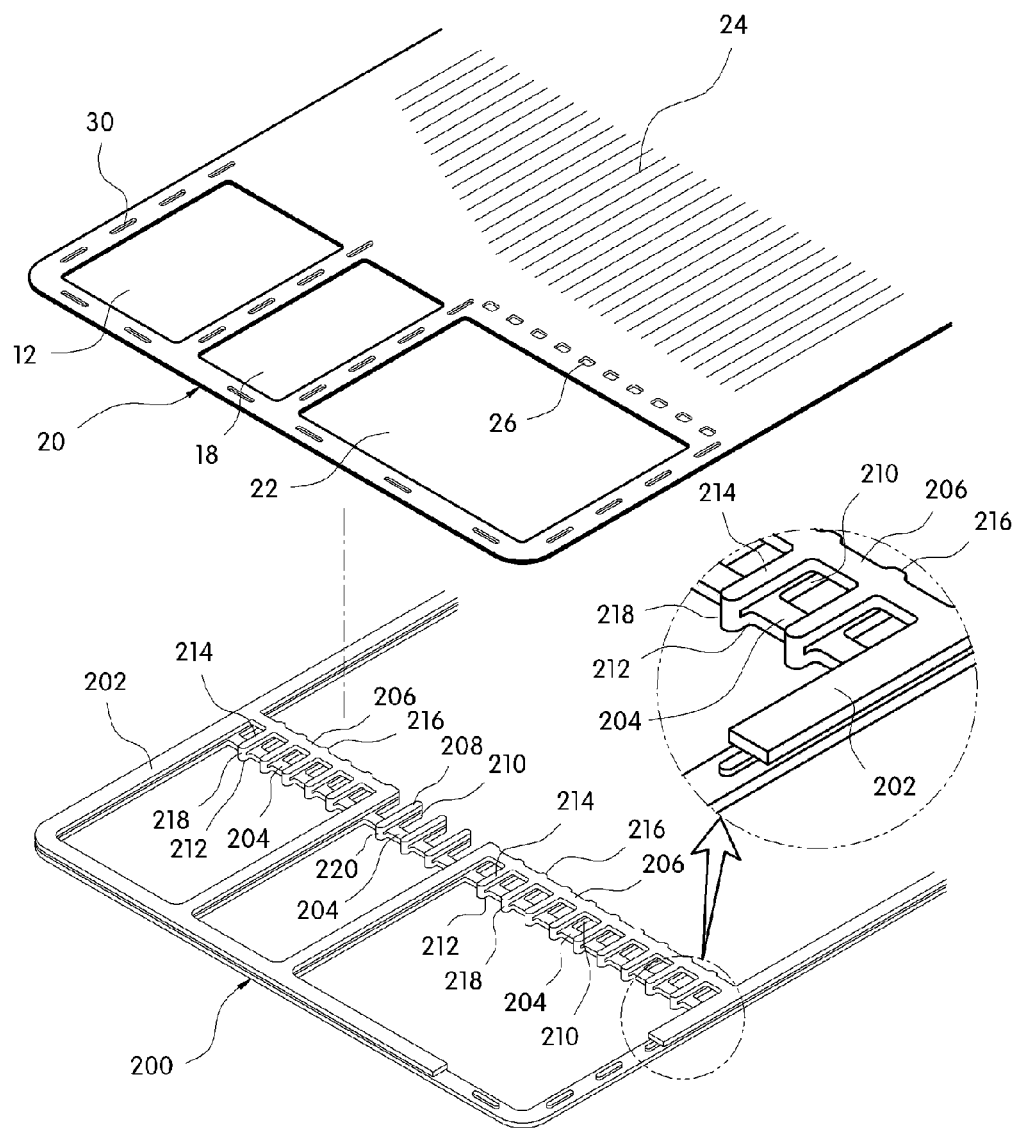
FIG. 5 is a perspective view showing that a gasket is disassembled from the second separator of the fuel cell separator having an airtight gasket in accordance with preferred embodiments of the present invention.
Figure 6A:
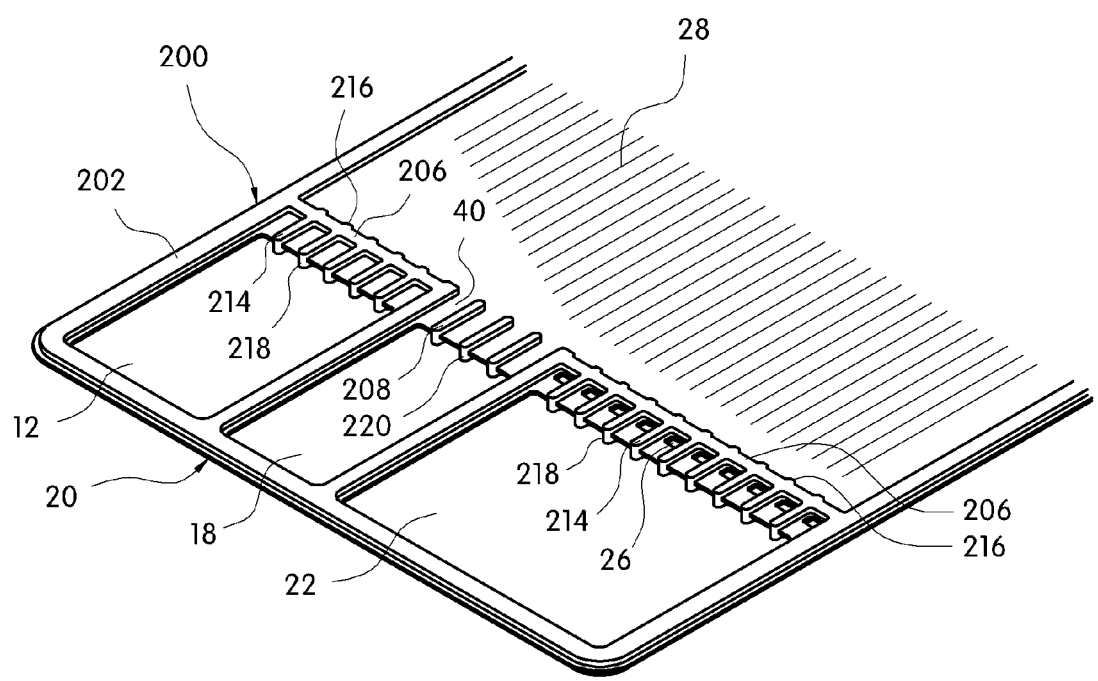
FIGS. 6A and 6B are perspective views showing the second separator of the fuel cell separator having an airtight gasket in accordance with other preferred embodiments of the present invention.
Figure 6B:
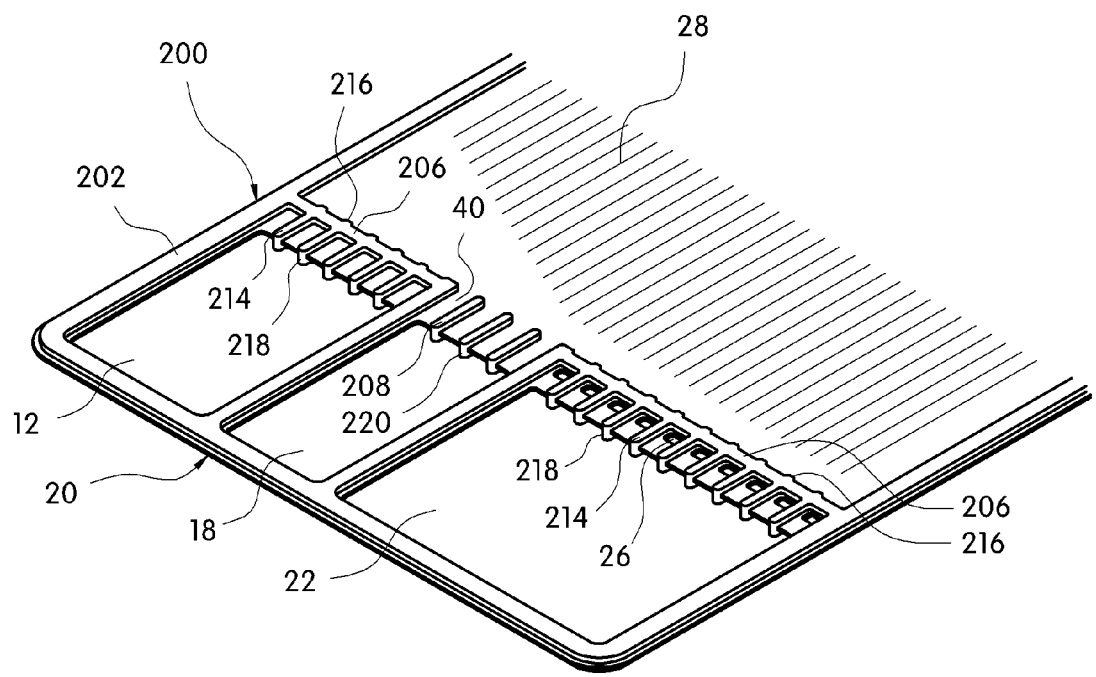

FIGS. 4A and 4B are a plan view and a bottom view showing the second separator of the fuel cell separator having an airtight gasket in accordance with further preferred embodiments of the present invention, FIG. 5 is an exemplary perspective view according to one preferred embodiment, showing that the gasket, which is intentionally disassembled from the first separator for a better understanding of the present invention, and FIGS. 6A and 6B are exemplary perspective views according to other preferred embodiments, showing the second separator of the fuel cell separator having the airtight gasket in accordance with the present invention.

Preferably, the second gasket 200 integrally injection-molded with the second separator 20 may be suitably divided into a side line 202, a second 1-main line 204, a second 2-main line 206, and a second coolant guide line 208.

According to further preferred embodiments, the side line 202 is integrally injection-molded on inner and outer surfaces of the second separator 20 along the four corners thereof and suitably serves to prevent reactant gases or coolant from flowing to the outside.

According to further preferred embodiments, the second 1-main line 204 is integrally connected to the side line 202 formed on the four corners of the outer surface of the second separator 20 and crosses the width of the second separator 20.

Further, the second 1-main line 204 is formed on the outer surface of the second separator 20, i.e., on the outer surface on which the air flow field 24 is formed. Preferably, the second 1-main line 204 is integrally formed between the inner side of the air manifold 22 having a rectangular hole shape and the air transport holes 26 and suitably extends in the width direction of the separator to a region adjacent to the inner sides of the coolant manifold 18 and the hydrogen manifold 12 placed on the same line as the air manifold 22.

According to further preferred embodiments, the second 2-main line 206 is integrally connected to the side line 202 formed on the four corners of the inner surface of the second separator 20 and crosses the width of the second separator 20.

Preferably, the second 2-main line 206 is suitably formed on the inner surface of the second separator 20, i.e., on the inner surface on which the coolant flow field 28 is formed. The second 2-main line 206 is preferably integrally formed between the air transport holes 26 and the coolant flow field 28 along the width direction of the separator and also integrally formed in a region adjacent to the inner side of the hydrogen manifold 12 placed on the same line.

In further preferred embodiments, a plurality of second coolant guide lines 208 are integrally injection-molded between the second 2-main lines 206, i.e., between the coolant manifold 18 and the coolant flow field 28 on the inner surface of the second separator 20 in the longitudinal direction of the separator.

Preferably, a plurality of sub-lines are integrally formed between the second 1-main line 204 and the second 2-main line 206 in the longitudinal direction of the separator. A second 1-sub-line 210 and a second 1'-sub line 212 are integrally formed on the second 1-main line 204, and a second 2-sub-line 214 and a second 2'-sub-line 216 are integrally formed on the second 2-main line 206.

According to certain exemplary embodiments, a plurality of second 1-sub-lines 210 having a predetermined length and extending toward the air flow field 24 are integrally formed on the inner side of the second 1-main line 204 and arranged at regular intervals in the width direction. Further, a plurality of second 1'-sub-lines 212 having a length smaller than that of the second 1-sub-lines 210 and extending toward the hydrogen, coolant, and air manifolds 12, 18, and 22 are integrally formed on the outer side of the second 1-main line 204 and are suitably arranged at regular intervals in the width direction.

In other preferred embodiments, a plurality of second 2-sub-lines 214 having a predetermined length and extending toward the inner sides of the hydrogen and air manifolds 12 and 22 are integrally formed on the outer side of the second 2-main line 206 and arranged at regular intervals in the width direction. Further, a plurality of second 2'-sub-lines 216 having a length smaller than that of second 2-sub-lines 214 and extending toward the coolant flow field 28 are integrally formed on the inner side of the second 2-main line 206 and arranged at regular intervals in the width direction.

In particular preferred embodiments, the end of the second 1'-sub-line 212 extending from the second 1-main line 204 toward the hydrogen and air manifolds 12 and 22 and the second 2-sub-line 214 extending from the second 2-main line 206 toward the hydrogen and air manifolds 12 and 22 are integrally connected to each other by a first connection line 218 on the inner sides of the hydrogen and air manifolds 12 and 22 having a rectangular hole shape. Further, the end of the second 1'-sub-line 212 extending from the second 1-main line 204 toward the coolant manifold 18 and the second coolant guide line 208 are integrally connected by a second connection line 220 on the inner side of the coolant manifold 18 having a rectangular hole shape.

Accordingly, the side line 202 formed on the corners of both surfaces of the second separator 20 is integrally connected to the second 1- and 2-main lines 204 and 206 formed on both surfaces of the second separator 20. Preferably, the second 1'-sub-lines 212 extending from the second 1-main line 204 and the second 2-sub-lines 214 extending from the second 2-main line 206 are integrally connected to each other by the first connection line 218. Further, the second 1'-sub-lines 212 extending from the second 1-main line 204 and the second coolant guide line 208 are preferably integrally connected to each other by the second connection line 220. resulting certain preferred embodiments, the side line 202, the second 1- and 2-main lines 204 and 206, the second 1- and 1'-sub-lines 210 and 212, the second 2- and 2'-sub-lines 214 and 216, and the first and second connection lines 218 and 220, which are the constituent elements of the second gasket 200, are integrally formed with each other to form a suitably closed curve.

The stacked structure and the flow of fluids between the first and second separators having the first and second gaskets integrally injection-molded therewith according to preferred exemplary embodiments of the present invention are described below.

Figure 7A:
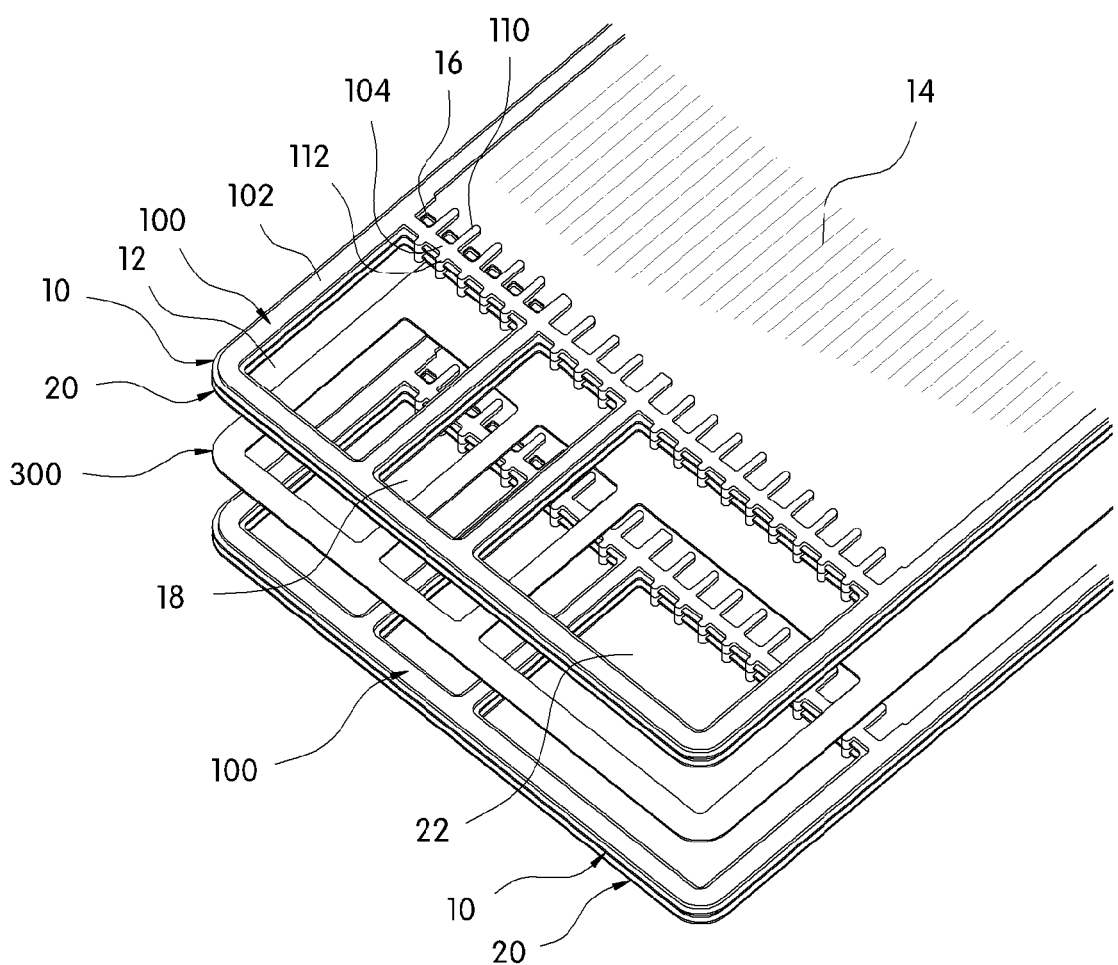
FIGS. 7A and 7B are exploded perspective views showing that the first and second separators of the fuel cell separator having an airtight gasket in accordance with preferred embodiments of the present invention are suitably stacked on both sides of a membrane electrode assembly.
Figure 7B:
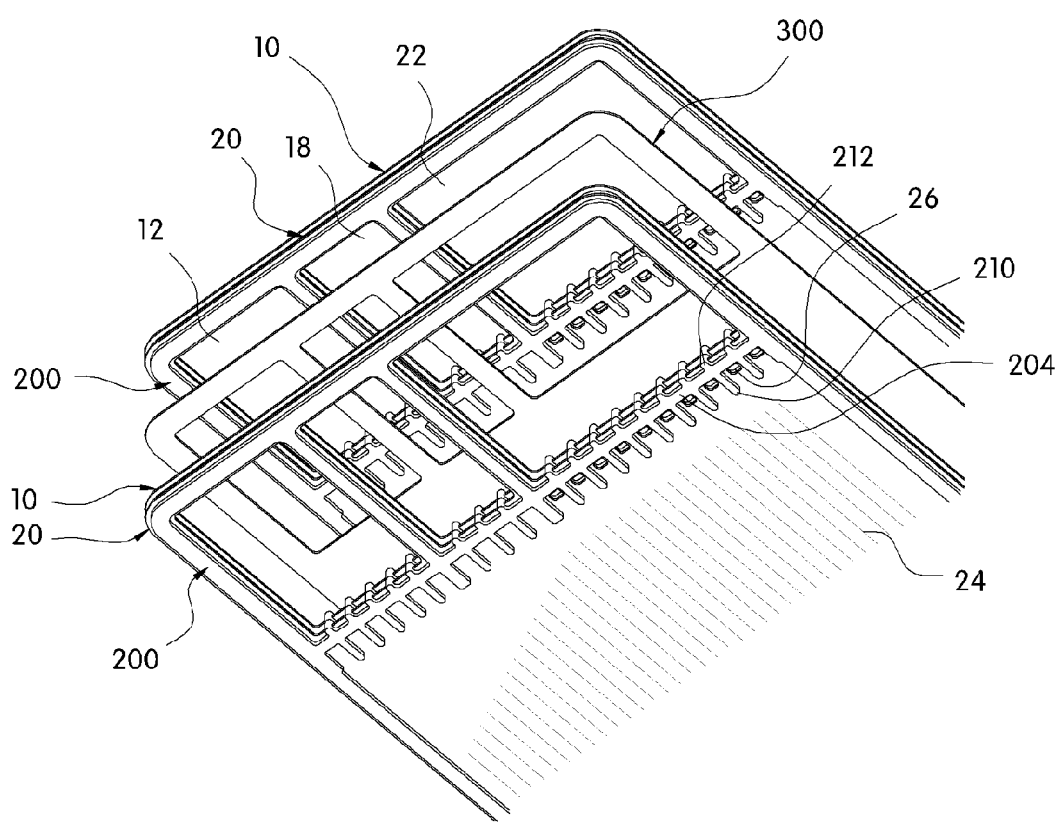
Figure 8:
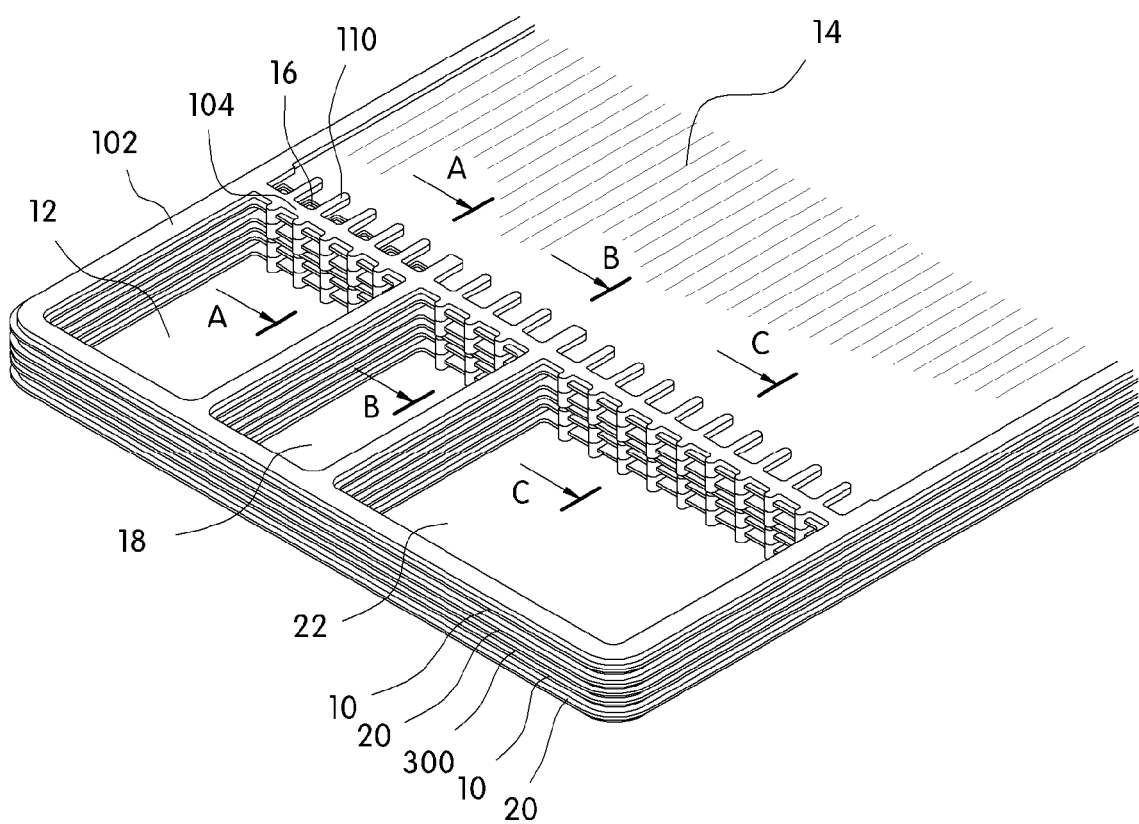
FIG. 8 is a perspective view showing that the first and second separators of the fuel cell separator having an airtight gasket in accordance with preferred embodiments of the present invention are suitably stacked on both sides of the membrane electrode assembly to form a unit cell of a fuel cell.

FIGS. 7A and 7B are exploded perspective views according to certain preferred embodiments, showing that the first and second separators of the fuel cell separator having an airtight gasket are suitably stacked on both sides of a membrane electrode assembly. FIG. 8 is a perspective view showing that the first and second separators of the fuel cell separator having an airtight gasket in accordance with certain preferred embodiments of the present invention are suitably stacked on both sides of the membrane electrode assembly to form a unit cell of the fuel cell.

Preferably, the first and second separators 10 and 20 having the pair of first and second gaskets 100 and 200 integrally injection-molded therewith are stacked on one side of a membrane electrode assembly (MEA) 300 having an electrolyte membrane, and the first and second separators 10 and 20 having the same structures are also stacked on the other side of the MEA 300.

Accordingly, the pair of first and second separators 10 and 20 are suitably stacked on one side of the MEA 300 and, at the same time, the pair of first and second separators 10 and 20 having the same structures are also suitably stacked on the other side of the MEA 300, thus forming a unit cell that constitutes the fuel cell.

Preferably, in the stacked structure of the first and second separators 10 and 20, the side line 102 formed on the inner surface of the first separator 10 is closely adhered to the side line 202 formed on the inner surface of the second separator 20, thus preventing fluids from flowing to the outside.

According to preferred exemplary embodiments, in this state, the hydrogen, and air flow in the following manner.

Flow of Coolant

Figure 10:
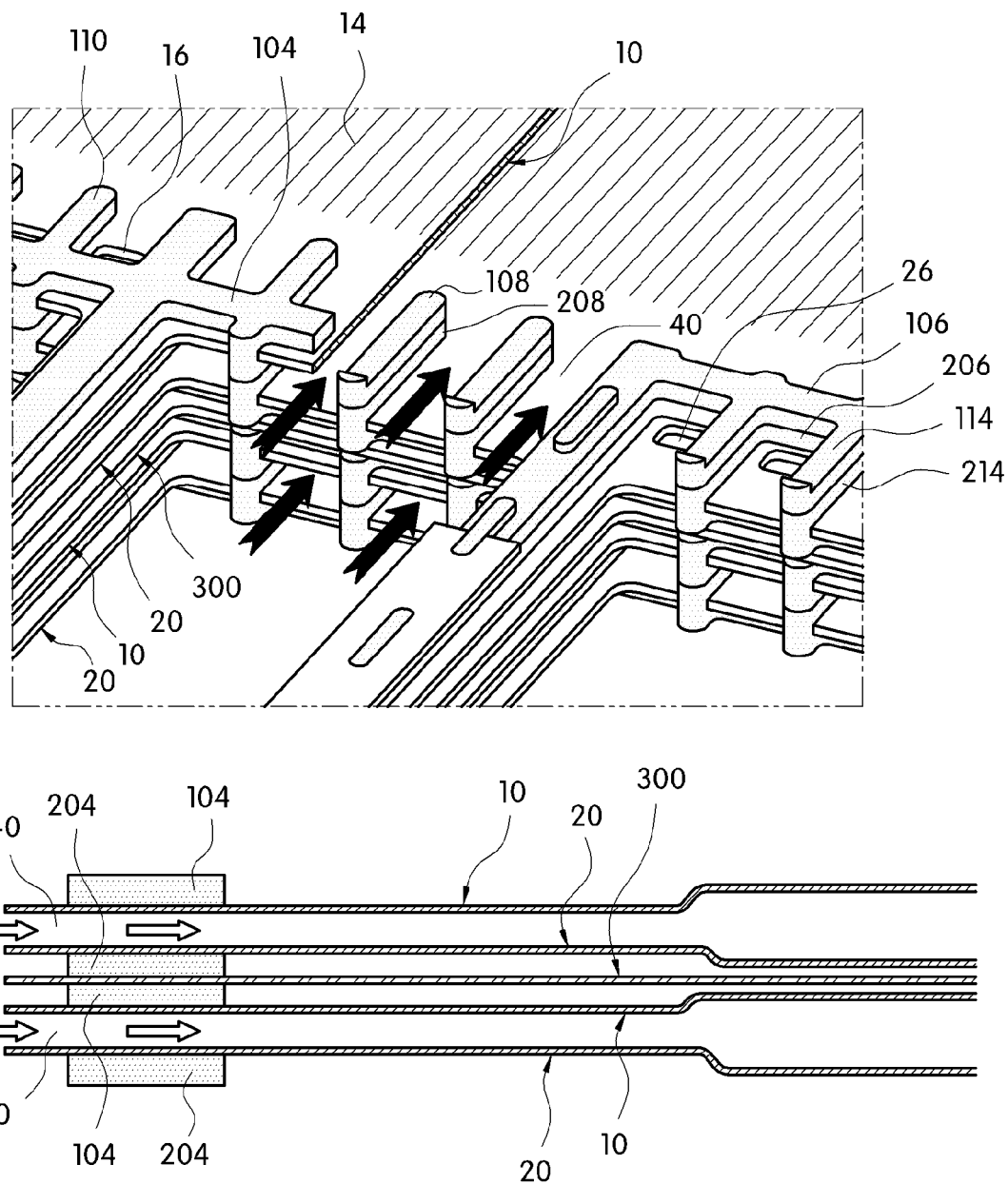
FIG. 10 is a cross-sectional view taken along line B-B of FIG. 8 and showing the flow of coolant.

FIG. 10 is a cross-sectional view taken along line B-B of FIG. 8 and showing the flow of coolant.

Preferably, when the first and second separators 10 and 20 are suitably stacked with respect to each other, the first 2-main line 106 suitably formed on the inner surface of the first separator 10 and the second 2-main line 206 suitably formed on the inner surface of the second separator 20 are closely adhered to each other and, at the same time, the first coolant guide line 108 formed on the first separator 10 and the second coolant guide line 208 formed on the second separator 20 are closely adhered to each other.

Accordingly, a coolant flow path 40 is suitably formed between the first and second coolant guide lines 108 and 208 closely adhered to each other in the longitudinal direction thereof.

Preferably, the first 2-main line 106 and the second 2-main line 206, which are closely adhered each other to maintain the airtightness, suitably prevent the reactant gases (such as hydrogen and air) flowing through the hydrogen and air manifolds 12 and 22 from flowing through the space between the first and second separators 10 and 20, i.e., toward the coolant flow field 28. As a result, the coolant flowing through the coolant manifold 18 passes through the coolant flow path 40 and flows through the coolant flow field 28 formed between the inner surfaces of the first and second separators 10 and 20, thus providing the cooling effect.

Flow of Hydrogen

Figure 9:
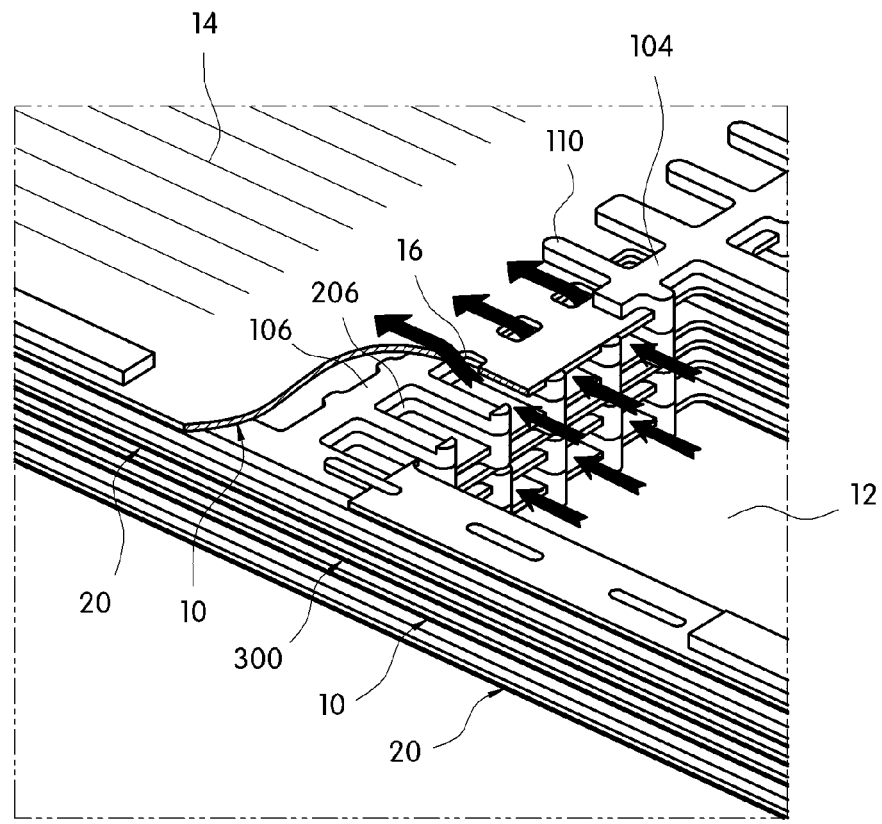
FIG. 9 is a cross-sectional view taken along line A-A of FIG. 8 and showing the flow of hydrogen.
Figure 9:
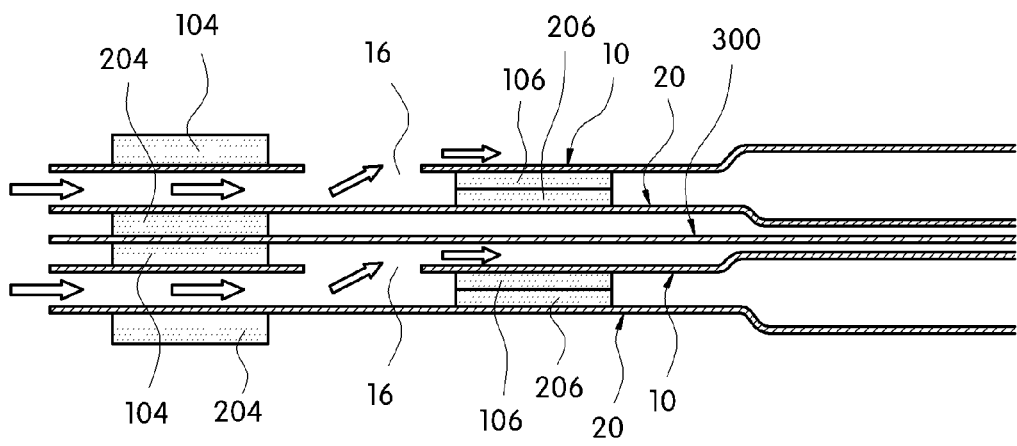

FIG. 9 is a cross-sectional view taken along line A-A of FIG. 8 and showing the flow of hydrogen.

According to certain preferred embodiments, when the first and second separators 10 and 20 are suitably stacked with respect to each other, the first 2-main line 106 formed on the inner surface of the first separator 10 and the second 2-main line 206 formed on the inner surface of the second separator 20 are preferably closely adhered to each other and, at the same time, the first 2-sub-lines 114 extending from the first 2-main line 106 and the second 2-sub-lines 214 extending from the second 2-main line 206 are preferably closely adhered to each other, thus suitably preventing the reactant gases (such as hydrogen and air) flowing through the hydrogen and air manifolds 12 and 22 from flowing toward the coolant flow field 28.

Preferably, the hydrogen flowing through the hydrogen manifold 12 passes through the space near the first 2-sub-lines 114 and the second 2-sub-lines 214, which are closely adhered to each other, and is then blocked by the first 2-main line 106 and the second 2-main line 206, which are closely adhered to each other.

However, according to further embodiments of the invention, since there are provided the hydrogen transport holes 16 of the first separator 10 when viewed from the space near the first 2-sub-lines 114 and the second 2-sub-lines 214, which are closely adhered to each other, to the first separator 10, the hydrogen passes through the hydrogen transport holes 16 of the first separator 10 and flows through the outer surface of the first separator 10, i.e., the hydrogen flow field 14 being in contact with one side of the MEA 300, thus participating in the reaction of the fuel cell for generating electricity.

Flow of Air

Figure 11:
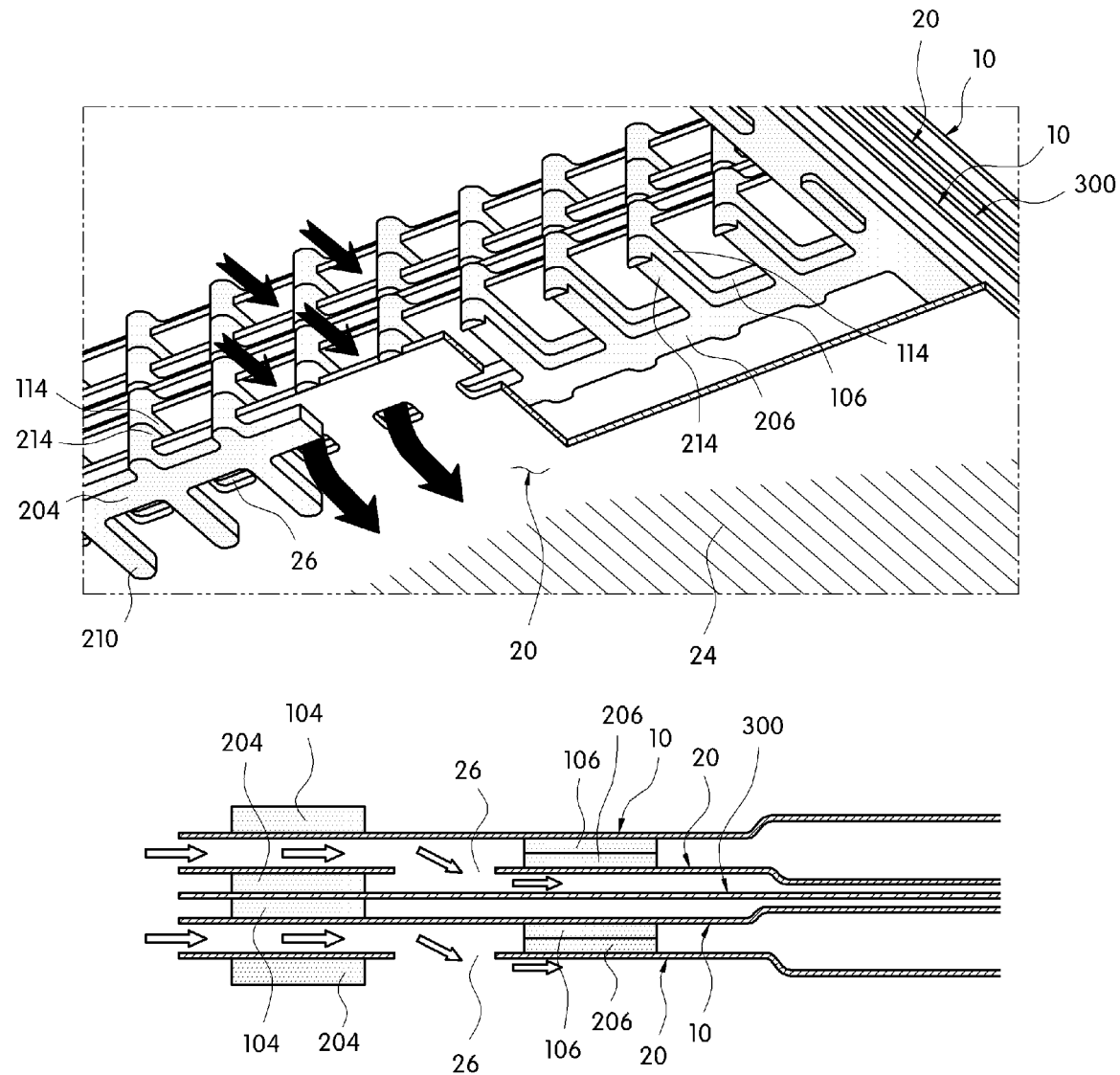
FIG. 11 is a cross-sectional view taken along line C-C of FIG. 8 and showing the flow of air.
Figure 12:
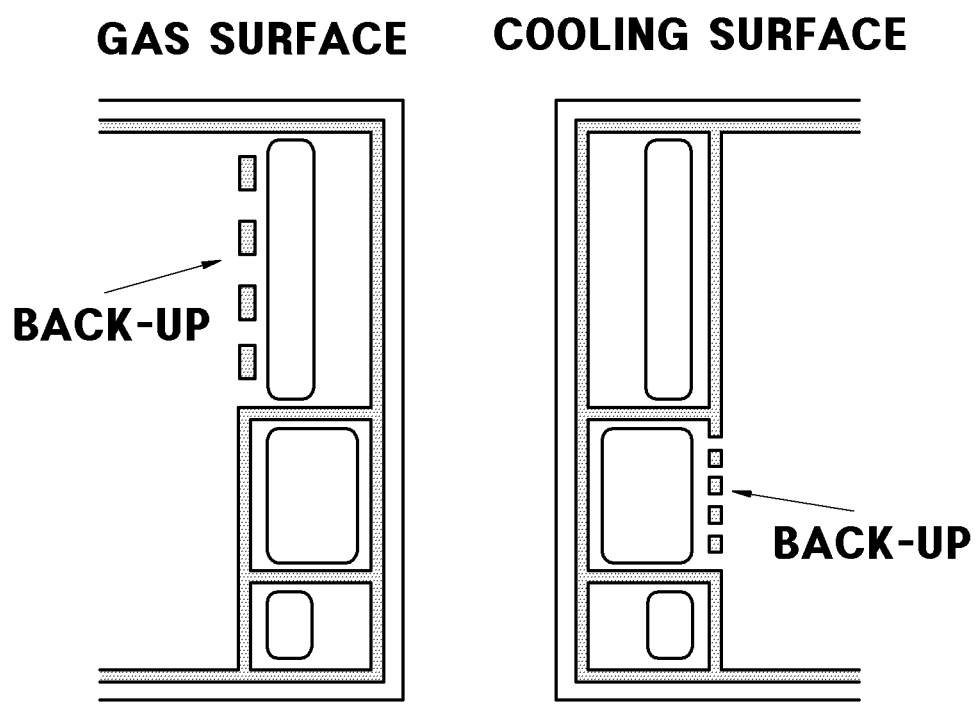
FIGS. 12 and 13 are schematic diagrams showing the structure of an exemplary conventional separator having a gasket.
Figure 13:
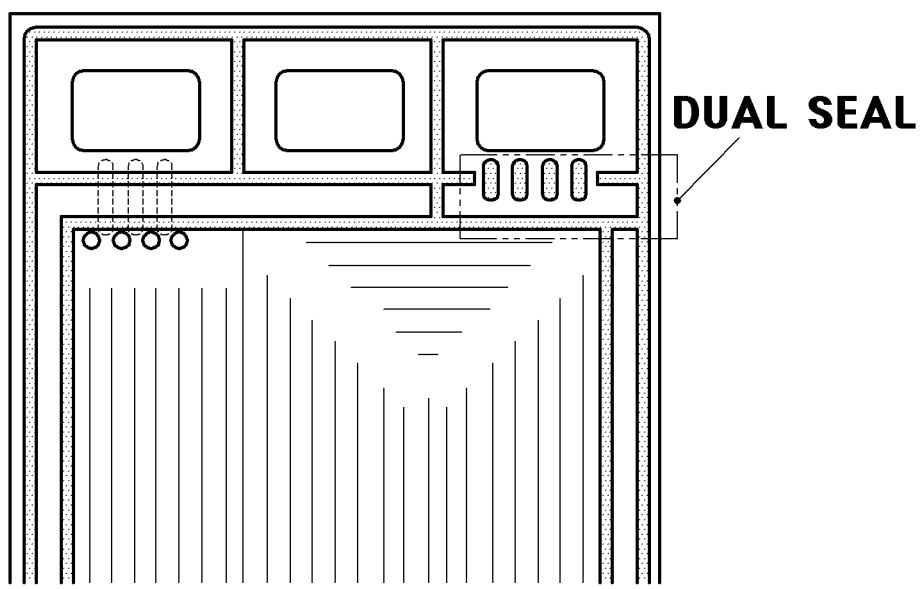
Figure 14:
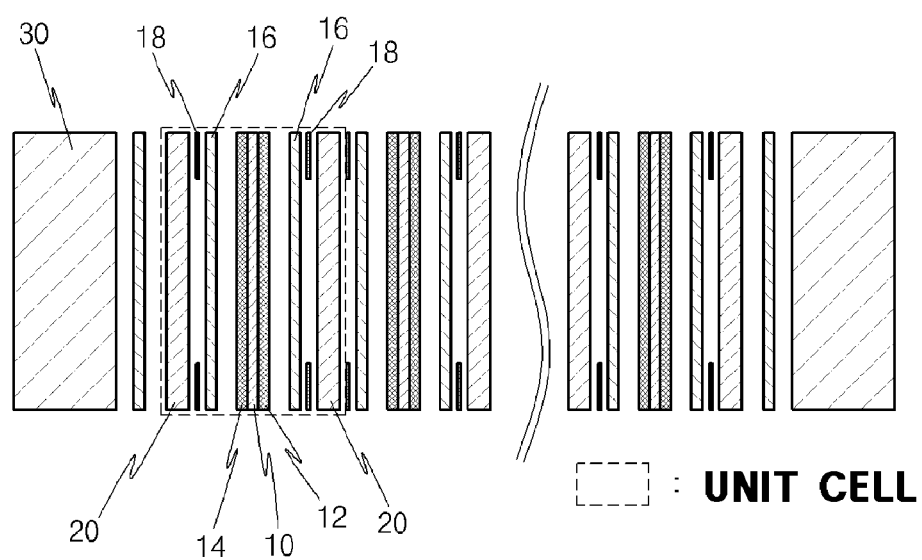
FIG. 14 is a schematic diagram showing an exemplary configuration of a typical fuel cell.

FIG. 11 is a cross-sectional view taken along line C-C of FIG. 8 and showing the flow of air.

According to other preferred embodiments, when the first and second separators 10 and 20 are suitably stacked with respect to each other, the first 2-main line 106 suitably formed on the inner surface of the first separator 10 and the second 2-main line 206 suitably formed on the inner surface of the second separator 20 are closely adhered to each other and, at the same time, the first 2-sub-lines 114 extending from the first 2-main line 106 and the second 2-sub-lines 214 extending from the second 2-main line 206 are closely adhered to each other, thus preventing the reactant gases (such as hydrogen and air) flowing through the hydrogen and air manifolds 12 and 22 from flowing toward the coolant flow field 28.

Preferably, the air flowing through the air manifold 22 passes through the space near the first 2-sub-lines 114 and the second 2-sub-lines 214, which are preferably closely adhered to each other, and is then suitably blocked by the first 2-main line 106 and the second 2-main line 206, which are closely adhered to each other.

Preferably, since there are provided the air transport holes 26 of the second separator 20 when viewed from the space near the first 2-sub-lines 114 and the second 2-sub-lines 214, which are closely adhered to each other, to the second separator 20, the air passes through the air transport holes 26 of the second separator 20 and flows through the outer surface of the second separator 20, i.e., the air flow field 24 being in contact with the other side of the MEA 300, thus participating in the reaction of the fuel cell for generating electricity.

As described herein, the present invention provides the following effects.

According to preferred embodiments of the present invention, since the gaskets are integrally injection-molded on both surfaces of the separators to be continuously connected to each other so as to form a suitably closed curve, it is possible to suitably increase the bonding strength between the separators and the gaskets and suitably improve the productivity.

Preferably, when the pair of first and second separators are suitably stacked with the MEA interposed therebetween, the main lines of the first gasket integrally injection-molded with the first separator and the main lines of the second gasket integrally injection-molded with the second separator are closely adhered to each other, and thus it is possible to precisely maintain the airtightness of the reactant gases. In further preferred embodiments, since the main lines and the respective sub-lines extending therefrom are closely adhered to each other, the load can be suitably dispersed when the first and second separators are stacked with respect to each other, and it is possible to provide a suitably strong supporting force to the stacked separators, thus providing structural stability.

Preferably, when the main lines of the first gasket and those of the second gasket are closely adhered to each other and the sub-lines extending from the main lines are closely adhered to each other, the independent paths for smoothly guiding the flow of fluids such as reactant gases and coolant are suitably formed to facilitate the flow of reactant gases and coolant, thus ensuring flow uniformity.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A fuel cell separator having an airtight gasket, characterized in that a gasket is integrally formed with both surfaces of a separator in a closed curve,
   the gasket including a first gasket and a second gasket, and the separator including a first separator and a second separator wherein the first gasket is provided on the first separator and includes;
   a side line integrally formed on inner and outer surfaces of the first separator along the four corners thereof;
   a first 1-main line formed on the outer surface of the first separator and extending through a space between the inner sides of a hydrogen manifold and hydrogen transport holes to a region adjacent to the inner sides of a coolant manifold and an air manifold placed on the same line as the hydrogen manifold along the width direction;
   a first 2-main line formed on the inner surface of the first separator and extending through a space between the hydrogen transport holes and a coolant flow field to a region adjacent to the inner side of the air manifold placed on the same line along the width direction; and
   a plurality of first coolant guide lines formed on the inner surface of the first separator and arranged between the coolant manifold and the coolant flow field along the longitudinal direction, and
   wherein a portion of a first 1'-sub-lines extending from the first 1-main line and a first 2-sub-lines extending from the first 2-main line are integrally connected to each other on the inner sides of the hydrogen and air manifolds by a first connection line, and the rest of the first 1'-sub-lines extending from the first 1-main line and the first coolant guide lines are integrally connected to each other on the inner side of the coolant manifold by a second connection line.

2. The fuel cell separator of claim 1, wherein the separator further comprises a plurality of hydrogen transport holes that are formed on an inner side of a hydrogen manifold, which is formed on both ends of the first separator, in a position adjacent to a hydrogen flow field and arranged along the width direction of the separator, and a plurality of air transport holes are formed on an inner side of an air manifold, which is formed on both ends of the second separator, in a position adjacent to an air flow field and arranged along the width direction of the separator.

3. The fuel cell separator of claim 1, wherein a plurality of injection molding holes, through which an injection molding material passes toward the inner or outer surfaces of the separator during injection molding of the gasket, are formed to penetrate four corner ends of the separator and boundary surfaces between each of manifolds.

4. The fuel cell separator of claim 1, wherein a plurality of first 1-sub-lines extending toward the hydrogen flow field are integrally formed on the inner side of the first 1-main line and arranged at regular intervals in the width direction, and a plurality of first 1'-sub-lines extending toward the hydrogen, coolant, and air manifolds are integrally formed on the outer side of the first 1-main line and arranged at regular intervals in the width direction.

5. The fuel cell separator of claim 1, wherein a plurality of first 2-sub-lines extending toward the inner sides of the hydrogen and air manifolds are integrally formed on the outer side of the first 2-main line and arranged at regular intervals in the width direction, and a plurality of first 2'-sub-lines extending toward the coolant flow field are integrally formed on the inner side of the first 2-main line and arranged at regular intervals in the width direction.

6. The fuel cell separator of claim 1, wherein the second gasket provided on the second separator comprising:
   a side line integrally formed on inner and outer surfaces of the second separator along the four corners thereof;
   a second 1-main line formed on the outer surface of the second separator and extending through a space between the inner sides of the air manifold and the air transport holes to a region adjacent to the inner sides of the coolant and hydrogen manifolds placed on the same line as the air manifold along the width direction;
   a second 2-main line formed on the inner surface of the second separator and extending through a space between a plurality of air transport holes and the coolant flow field to a region adjacent to the inner side of the hydrogen manifold placed on the same line along the width direction; and
   a plurality of second coolant guide lines formed on the inner surface of the second separator and arranged between the coolant manifold and the coolant flow field along the longitudinal direction.

7. The fuel cell separator of claim 6, wherein a plurality of second 1-sub-lines extending toward the air flow field are integrally formed on the inner side of the second 1-main line and arranged at regular intervals in the width direction, and a plurality of second 1'-sub-lines extending toward the hydrogen, coolant, and air manifolds are integrally formed on the outer side of the second 1-main line and arranged at regular intervals in the width direction.

8. The fuel cell separator of claim 6, wherein a plurality of second 2-sub-lines extending toward the inner sides of the hydrogen and air manifolds are integrally formed on the outer side of the second 2-main line and arranged at regular intervals in the width direction, and a plurality of second 2'-sub-lines extending toward the coolant flow field are integrally formed on the inner side of the second 2-main line and arranged at regular intervals in the width direction.

9. The fuel cell separator of claim 6, wherein a portion of the second 1'-sub-lines extending from the second 1-main line and the second 2-sub-lines extending from the second 2-main line are integrally connected to each other on the inner sides of the hydrogen and air manifolds by a first connection line, and the rest of the second 1'-sub-lines extending from the second 1-main line and the second coolant guide lines are integrally connected to each other on the inner side of the coolant manifold by a second connection line.

* * * * *